(12) United States Patent
Patzwald

(10) Patent No.: US 8,928,874 B2
(45) Date of Patent: Jan. 6, 2015

(54) METHOD FOR IDENTIFYING ABNORMAL SPECTRAL PROFILES MEASURED BY A CHROMATIC CONFOCAL RANGE SENSOR

(75) Inventor: Andrew Michael Patzwald, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 406 days.

(21) Appl. No.: 13/405,214

(22) Filed: Feb. 24, 2012

(65) Prior Publication Data
US 2013/0222797 A1    Aug. 29, 2013

(51) Int. Cl.
| | |
|---|---|
| *G01J 3/00* | (2006.01) |
| *G01C 3/00* | (2006.01) |
| *G01C 5/00* | (2006.01) |
| *G01C 3/08* | (2006.01) |
| *G01B 11/30* | (2006.01) |
| *G01B 11/24* | (2006.01) |

(52) U.S. Cl.
USPC ....... 356/237.1; 356/3.1; 356/4.01; 356/4.04; 356/4.1; 356/609

(58) Field of Classification Search
USPC .................................. 356/4.04, 237.1–237.6
See application file for complete search history.

(56) References Cited

U.S. PATENT DOCUMENTS

| | | | |
|---|---|---|---|
| 4,701,049 A | 10/1987 | Beckmann | |
| 6,530,156 B1 | 3/2003 | Matsuyama | |
| 7,191,184 B2 | 3/2007 | Laborde | |
| 7,477,401 B2 | 1/2009 | Marx | |
| 7,873,488 B2 | 1/2011 | Nahum | |
| 7,876,456 B2 | 1/2011 | Sesko | |
| 7,876,546 B2 | 1/2011 | Locke | |
| 7,990,522 B2 | 8/2011 | Sesko | |
| 8,078,245 B2 | 12/2011 | Daly et al. | |
| 8,134,691 B2 | 3/2012 | Xie | |
| 2005/0030528 A1 | 2/2005 | Geffen | |
| 2007/0237048 A1* | 10/2007 | Matsui | 369/53.2 |
| 2008/0030743 A1 | 2/2008 | Lehmann | |
| 2008/0259783 A1* | 10/2008 | Miyashta et al. | 369/284 |
| 2009/0296118 A1 | 12/2009 | Tsukamoto | |
| 2010/0003005 A1 | 1/2010 | Sugihara | |
| 2010/0188742 A1 | 7/2010 | Chen | |
| 2010/0268544 A1 | 10/2010 | Nitahara | |
| 2010/0284025 A1 | 11/2010 | Sesko | |

(Continued)

OTHER PUBLICATIONS

International Search Report and Written Opinion mailed Jun. 4, 2013, in International Application No. PCT/US2013/027687, filed Feb. 25, 2013, 7 pages.

*Primary Examiner* — Kara E Geisel
*Assistant Examiner* — Hina F Ayub
(74) *Attorney, Agent, or Firm* — Christensen O'Connor Johnson Kindness PLLC

(57) ABSTRACT

A method for operating a chromatic range sensor (CRS) system to identify abnormal spectral profiles arising from light reflected from more than one portion of a workpiece surface is provided. The method comprises: providing a CRS system comprising: an optical element, a light source, and CRS electronics comprising a CRS wavelength detector; operating the CRS system to receive an output spectral profile from a measurement point on a workpiece surface and provide corresponding output spectral profile data; analyzing the output spectral profile data to provide a peak region asymmetry characterization; and providing a corresponding abnormality indicator if the peak region asymmetry characterization indicates that the peak region is abnormally asymmetric.

15 Claims, 8 Drawing Sheets

(56) References Cited

U.S. PATENT DOCUMENTS

| | | | |
|---|---|---|---|
| 2010/0332173 A1* | 12/2010 | Watson et al. | 702/85 |
| 2011/0066385 A1 | 3/2011 | Rajwa | |
| 2011/0080576 A1* | 4/2011 | Thiel et al. | 356/73 |
| 2011/0133054 A1 | 6/2011 | Campbell | |
| 2011/0184694 A1 | 7/2011 | Grimberg | |
| 2011/0267459 A1 | 11/2011 | Choi | |
| 2011/0286006 A1 | 11/2011 | Xie | |
| 2011/0317171 A1 | 12/2011 | Emtman | |

* cited by examiner

METHOD FOR IDENTIFYING ABNORMAL SPECTRAL PROFILES MEASURED BY A CHROMATIC CONFOCAL RANGE SENSOR

FIELD OF THE INVENTION

The invention relates generally to precision measurement instruments, and more particularly, to chromatic range sensors and similar optical distance determining devices and their use.

BACKGROUND OF THE INVENTION

It is known to use chromatic confocal techniques in optical height or distance or range sensors. As described in U.S. Pat. No. 7,876,456 (the '456 patent), which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or distance relative to the focusing element determines which wavelength is best focused. Upon reflection from the surface, the light is refocused onto a small detector aperture, such as a pinhole or the end of an optical fiber. Upon reflection from the surface and passing back through the optical system to the in/out fiber, only the wavelength that is well-focused on the surface is well-focused on the aperture. All of the other wavelengths are poorly focused on the aperture, and so will not couple much power into the fiber. Therefore, for the light returned through the fiber, the signal level will be greatest for the wavelength corresponding to the surface height or distance to the surface. A spectrometer-type detector measures the signal level for each wavelength in order to determine the surface height.

The '456 patent further describes that certain manufacturers refer to practical and compact systems that operate as described above, and that are suitable for chromatic confocal ranging in an industrial setting as chromatic point sensors (CPS) or chromatic line sensors or the like. A compact chromatically-dispersive optical assembly that is used with such systems that measure the distance to a surface point is referred to as an "optical pen" or a "pen." The optical pen is connected through an optical fiber to an electronic portion of the chromatic point sensor which transmits light through the fiber to be output from the optical pen and which provides a spectrometer that detects and analyzes the returned light. The returned light forms a wavelength-dispersed intensity profile received by the spectrometer's detector array. Pixel data corresponding to the wavelength-dispersed intensity profile is analyzed to determine the "dominant wavelength position coordinate" as indicated by a peak or centroid of the intensity profile, and the resulting pixel coordinate of the peak or centroid is used with a lookup table to determine the distance to the surface. This pixel coordinate may be determined with sub pixel resolution, and may be referred to as the "distance-indicating coordinate."

The '456 patent further describes that in normal operation the CPS spectrometer ordinarily receives a certain range or peak region of wavelengths for a certain measurement distance. It is disclosed that the CPS spectrometer may distort the shape of the peak region of wavelengths, and thus influence the corresponding peak or centroid and the resulting distance-indicating coordinate. The systems and methods of the '456 patent provide component calibration data, also referred to as compensation data, that encompasses the effects of wavelength-dependent variations (e.g., non-uniform response) in the CPS spectrometer, and/or the CPS broadband light source. The compensation data of the '456 patent is used to reduce or eliminate errors associated with these effects in the spectrometer and light source. The compensation data of the '456 patent may be redetermined and/or replaced at various points in time, such that the compensation data remains effective to reduce or eliminate errors despite changes in the spectrometer and/or light source characteristics (e.g., due to component aging, environmental variations, or the like).

U.S. Patent Pre-Grant Publication No. 2010/0188742, which is hereby incorporated herein by reference in its entirety, discloses a chromatic range sensor which is a "line sensor" that uses a slit aperture and focuses light along a line rather than a point, providing the capability to measure a distance to a surface at a number of points along that line.

In various chromatic range sensor systems, there is nothing to prevent the detection of more than one spectral peak based on the light reflected from an intended measurement location. In some cases, this is advantageous for measuring the thickness of a transparent thin film. That is, a first spectral peak may correspond to a first distance to the top surface of a transparent film, and a second spectral peak may correspond to a second distance to the bottom surface of that film and/or the surface of the substrate that carries it. However, in other cases, two spectral peaks may occur unpredictably (e.g., due to an unexpected secondary reflection that passes back through a primary or intended measurement location). This may lead to an unexpected and/or erroneous measurement result (e.g., measurement errors that are a significant portion of the measurement range, for example). Providing an improved chromatic range sensor system including a means to identify the presence of measurement errors due to unexpected secondary reflections would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The embodiments described herein are aimed toward identifying abnormal spectral profiles, and/or measurement points corresponding to abnormal spectral profiles, such as abnormal spectral profiles resulting from unexpected secondary reflections, for example. In this way, a user or host system may be alerted to potential error in the measurements associated with such spectral profiles. This is especially valuable for relatively unskilled users, who may not understand the potential for such errors. It may also be valuable for relatively skilled users who wish to determine which measurement locations result in unwanted secondary reflections. It may also be valuable for relatively skilled users who wish to determine when a thin film is too thin to provide two distinct spectral peaks as outlined above. In such a case, the two peaks may merge to form a distorted peak which cannot be analyzed to provide a valid measurement for either of the first or second thin film surfaces. In various embodiments an abnormal spectral profile may be analyzed to provide a peak region asymmetry characterization that detects unexpected "dual peaks," or a degree of peak distortion, or both. Such abnormal spectral profile detection is not contemplated by the '456 patent or other known prior art systems.

In various embodiments, a method is provided for operating a chromatic range sensor (CRS) system to identify abnormal spectral profiles arising from light reflected from more than one portion of a workpiece surface (e.g., light reflected by the front and back surfaces of a thin film, or unexpected secondary reflection light that passes back through a measurement location that is intended to provide the primary reflection light as the basis for a measurement). The method comprises: providing a CRS system comprising: an optical element configured to focus different wavelengths at different distances proximate to a workpiece surface to be measured, a light source connected to provide an input spectral profile of wavelengths to the optical element; and CRS electronics comprising a CRS wavelength detector comprising a plurality of pixels distributed along a measurement axis of the CRS wavelength detector, the plurality of pixels receiving respective wavelengths and providing output spectral profile data, wherein the CRS is configured such that when the optical pen is connected to the CRS electronics and operably positioned relative to the workpiece surface to perform measurement operations the optical pen inputs the input spectral profile and outputs corresponding radiation to the workpiece surface and receives reflected radiation from the workpiece surface and outputs reflected radiation to provide an output spectral profile to the CRS wavelength detector, the output spectral profile having a wavelength peak that indicates a measurement distance from the optical pen to the workpiece surface, and the CRS electronics provide corresponding output spectral profile data; operating the CRS system to provide an output spectral profile from a measurement point on a workpiece surface and provide the corresponding output spectral profile data; operating the CRS wavelength detector to determine output spectral profile data from the output spectral profile; analyzing the output spectral profile data to provide a peak region asymmetry characterization; and providing a corresponding abnormality indicator if the peak region asymmetry characterization indicates that the peak region is abnormally asymmetric.

In some embodiments, the step of analyzing the output spectral profile data to provide a peak region asymmetry characterization may be performed by the CRS system. In some embodiments, the step of analyzing the output spectral profile data to provide a peak region asymmetry characterization may be performed automatically by the CRS system. In some embodiments, the operating, analyzing and providing steps may be performed repeatedly. In some embodiments, the operating, analyzing, and providing steps may be performed repeatedly at a measurement rate of the CRS system.

In some embodiments, the step of analyzing the output spectral profile data to provide a peak region asymmetry characterization may comprise determining the value of a peak region asymmetry metric based on the output spectral profile data. In some embodiments, the step of providing a corresponding abnormality indicator if the peak region asymmetry characterization indicates that the peak region is abnormally asymmetric may comprise comparing the value of the peak region asymmetry metric to an asymmetry metric threshold value, and providing the corresponding abnormality indicator if the value of the peak region asymmetry metric exceeds the asymmetry metric threshold value. In some embodiments, determining the value of a peak region asymmetry metric may comprise determining a peak pixel index coordinate based on the output spectral profile data, determining a measurement distance-indicating coordinate based on the output spectral profile data, and determining the value of the peak region asymmetry metric based on a difference between the peak pixel index coordinate and the measurement distance indicating coordinate. In some embodiments, the difference between the peak pixel index coordinate and the measurement distance-indicating coordinate may comprise a number of pixels and the asymmetry metric threshold value may comprise a threshold number of pixels. In some embodiments, the threshold number of pixels may be at least 5. In some embodiments, the threshold number of pixels may be selected by a user in a user interface connected to the CRS system. In some embodiments, determining the value of a peak region asymmetry metric may comprise determining a Pearson coefficient.

In some embodiments, the method further may comprise outputting the corresponding abnormality indicator from the CRS system if the peak region asymmetry characterization indicates that the peak region is abnormally asymmetric. In some embodiments, the abnormality indicator may be output in association with a corresponding measurement distance output by the CRS system.

In some embodiments, the CRS system may comprise a chromatic point sensor system and the optical element may comprise an optical pen. In some embodiments, the CRS system may comprise a chromatic line sensor system which uses a slit aperture, and the measurement point may be a measurement point along the line of light of the line sensor system. In some embodiments, the CRS system may comprise a chromatic camera or array sensor system which has a 2D field of view, and the measurement point may be a measurement point within the 2D field of view.

In some applications of a chromatic range sensor, it has been known to eliminate outlier measurements of a surface profile (e.g., a screw thread profile) based on geometric outlier considerations. It will be appreciated that the systems and methods disclosed herein may provide a more robust and reliable method for distinguishing erroneous CRS measurements than such ad hoc geometric methods, providing direct identification of unreliable measurements and/or measurement locations on a workpiece for both unskilled and skilled users.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
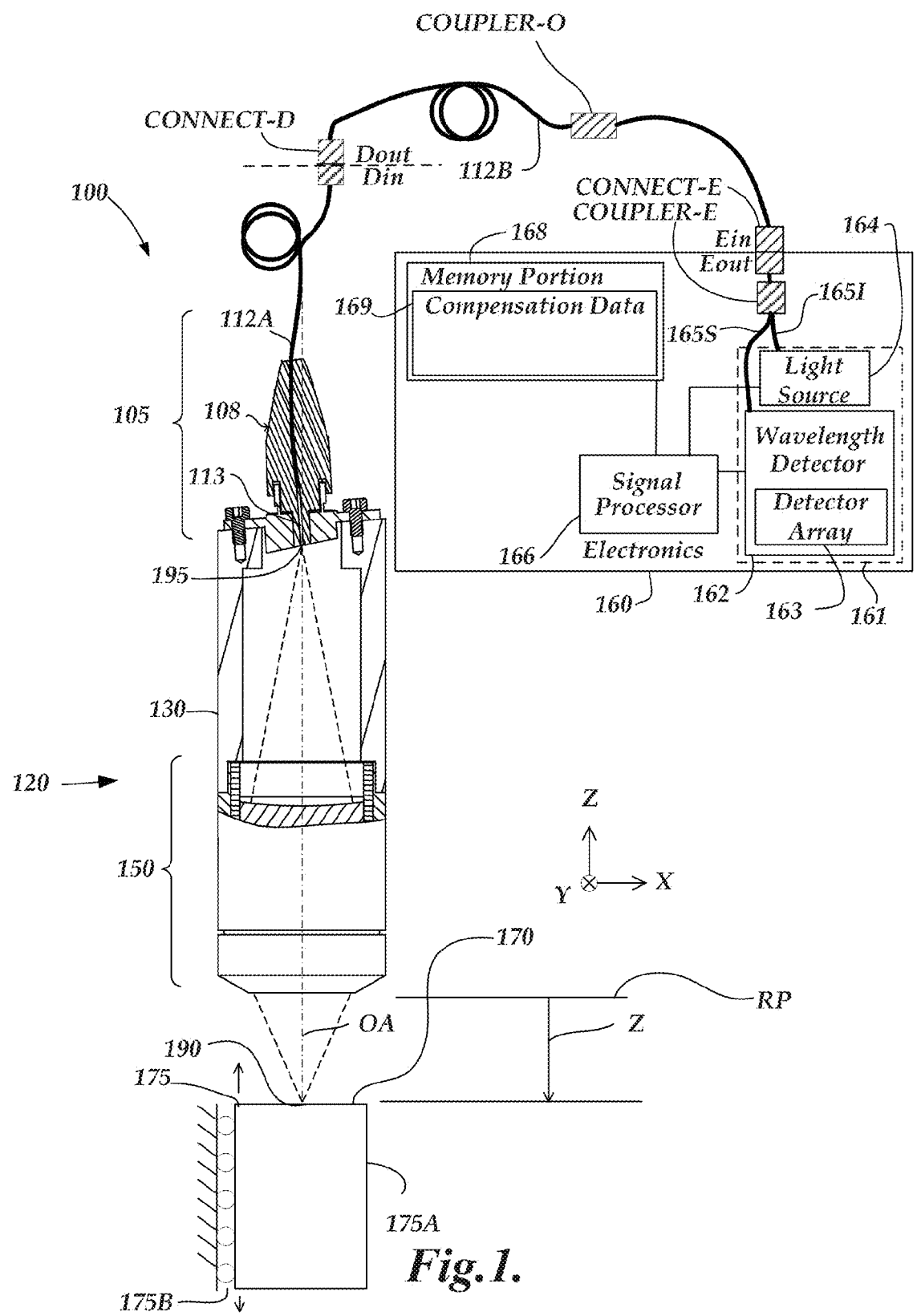
FIG. 1 is a block diagram of one embodiment of an exemplary chromatic range sensor (CRS) system.

FIG. 1 is a block diagram of one exemplary embodiment of a chromatic range sensor (CRS) system 100. As shown in FIG. 1, the CRS system 100 includes an optical element 120 and an electronics portion 160. In the embodiment shown in FIG. 1, the electronics portion 160 includes a signal processor 166, a memory portion 168 and a source+detector subsystem 161 comprising a wavelength detector 162, and a broadband light source 164 (also referred to as a white light source, in some embodiments). It should be appreciated that the CRS system 100 shown in FIG. 1 is a chromatic point sensor system which measures a single measurement point at a time. The optical element 120 shown in FIG. 1 is an optical pen. However, in various embodiments alternative types of chromatic range systems, such as a chromatic line sensor, may be configured to operate according to the systems and methods disclosed herein. In various embodiments, the wavelength detector 162 includes a detector array 163 of a spectrometer. The detector array 163 may comprises a plurality of pixels distributed along a measurement axis of the wavelength detector 162, the plurality of pixels receiving respective wavelengths and providing output spectral profile data. The electronics portion 160 is coupled to the optical element 120 through an optical path including the fiber optic cable 112. In the embodiment shown in FIG. 1, optional or alternative aspects of the optical path are shown, including the fiber optic cable 112 having first and second segments 112A and 112B joined at a connector CONNECT-D in the fiber optic segment 112B, and a coupler COUPLER-O which joins the segment 112B to the electronics portion 160. The light source 164 is connected to input a spectral profile of wavelengths to the fiber optic cable 112. The optical element 120 includes an in/out fiber optic sub assembly 105, a housing 130, and an optics portion 150. The in/out fiber optic sub assembly 105 comprises an in/out optical fiber 113 carried through a fiber optic cable 112 which encases it, and a fiber optic connector 108. The in/out optical fiber 113 outputs an output beam through an aperture 195, and receives reflected measurement signal light through the aperture 195.

In operation, light emitted from the fiber end through the aperture 195 is focused by the optics portion 150, which includes a lens that provides an axial chromatic dispersion such that the focal point along the optical axis OA is at different distances depending on the wavelength of the light, as is known for chromatic confocal sensor systems. As will be described in more detail below, during measurement operations, the light is focused on a surface location 190 of a workpiece 170. Upon reflection from the surface location 190, the light is refocused by the optics portion 150 onto the aperture 195. Due to the axial chromatic dispersion provided by the optics portion 150, only one wavelength will have the focus distance that matches the measurement distance "Z," which is the distance from a reference position RP that is fixed relative to the optical element 120 to the surface location 190. The chromatic range sensor 100 is configured such that the wavelength that is best focused at the surface location 190 will also be the wavelength that is best focused at the aperture 195. The aperture 195 spatially filters the reflected light such that predominantly the best focused wavelength passes through the aperture 195 and into the core of the optical fiber 113 of the optical fiber cable 112. As will be described in more detail below, the optical fiber cable 112 routes the signal light to a wavelength detector 162 that is utilized for determining the wavelength having the dominant intensity, which corresponds to the measurement distance Z to the surface location 190.

During normal measurement operations, the broadband light source 164, which is controlled by the signal processor 166, is coupled to the CRS optical element 120 through a fiber optic path including the illumination fiber segment 165I, the 2×1 coupler COUPLER-E, CONNECT-E, and the fiber optic cable 112. As described above, the light travels through the optical element 120 which produces longitudinal chromatic aberration. The wavelength of light that is most efficiently transmitted back through the aperture 195 and into the fiber optic cable 112 is the wavelength that is in focus on the surface location 190. The reflected wavelength-dependent light intensity then passes back through the fiber optic path to the electronics portion 160 and the coupler COUPLER-E so that approximately 50% of the light is directed through the signal fiber segment 165S to the wavelength detector 162. The wavelength detector 162 receives the wavelength-dependent light intensity, converts it to an output spectral intensity profile (also referred to as simply as an output spectral profile) distributed over an array of pixels along a measuring axis of the detector array 163, and operates to provide corresponding output spectral profile data based on pixel data output from the detector array 163.

The subpixel-resolution distance-indicating coordinate (DIC) of the profile data is calculated by the signal processor 166,and the DIC determines the measurement distance Z to the surface location 190 via a distance calibration lookup table or the like, which is stored in the memory portion 168, as will be described in more detail below with respect to FIG. 4. The distance-indicating coordinate may be determined by various methods described further below (e.g., by determining the centroid of profile data included in a peak region of the profile data). When the distance-indicating coordinate is determined during calibration operations, it may be referred to as a calibration distance-indicating coordinate, and when it is determined during workpiece surface measurement operations, it may be referred to as a measurement distance-indicating coordinate. The profile data used to determine the subpixel distance-indicating coordinate is described in greater detail below.

FIG. 1 includes orthogonal XYZ coordinate axes as a frame of reference. The Z direction is defined to be parallel to the optical axis, or distance-measuring axis, of the optical element 120. As illustrated in FIG. 1, during operation, the workpiece 170 is placed along the optical axis OA of the optical element 120. In one embodiment, the workpiece 170 is aligned and mounted on a translation stage 175 which may be advantageously aligned such that it translates along the Z axis direction constrained by guide bearings 175B, with its surface 175A nominally parallel to the XY plane. Other exemplary features and operations of the chromatic range sensor 100 will be described in more detail below.

Figure 2:
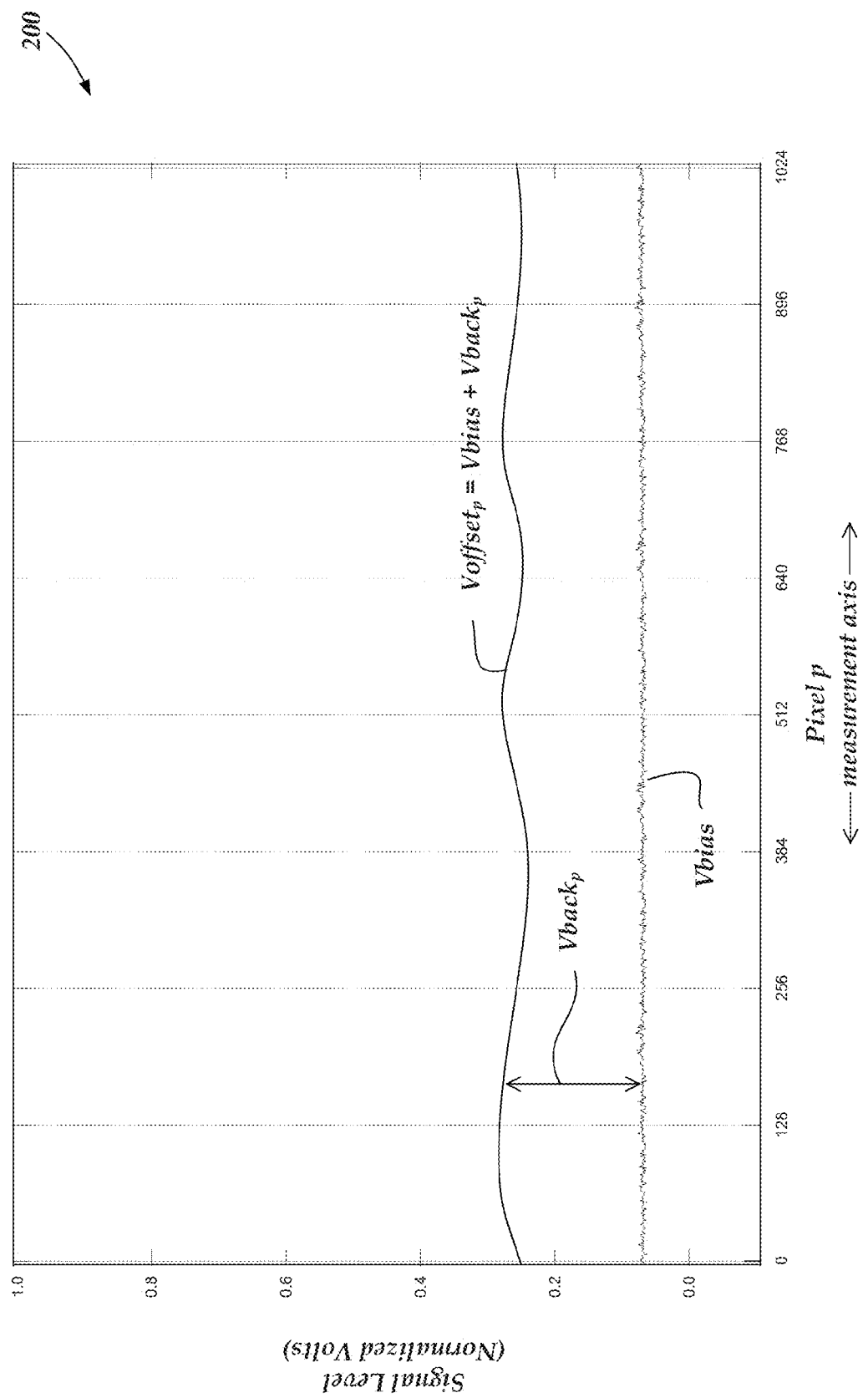
FIG. 2 is a diagram of profile data from a chromatic range sensor illustrating voltage offset signal levels for the pixels in a detector array.

The following description of FIG. 2 outlines certain known background signal processing and/or calibration operations that may be used in combination with this invention, in various embodiments. The purpose of this description is to emphasize that the inventive methods disclosed further below are distinct from, but compatible with, these operations. FIG. 2 is a diagram 200 of profile data from a chromatic range sensor illustrating voltage offset signal levels Voffset(p) for the pixels in a detector array 163 when no measurement surface is present (e.g., the surface location 190 of the workpiece 170 of FIG. 1 is not present), such that there is no intentionally reflected light and no significant dominant wavelength peak in the resulting intensity profile. As shown in FIG. 2, the voltage offset signal Voffset(p) is plotted in normalized volts, for each of 1,024 pixels. "Normalized volts" assigns a value of 1.0 to the saturation voltage of the detector array 163. The voltage offset signal Voffset(p) includes a bias signal level Vbias, which is shown as unvarying across the array, and a background signal component Vback(p), which is shown as being dependent upon the pixel coordinate p across the array. The variable background signal Vback(p) represents signals such as background light from wavelength-dependent spurious reflections and the like in the chromatic range sensor, as well as due to the dark current of the various pixels p. In various embodiments, it is advantageous if the signal components Vback(p) (or signals that show the same variation, such as the voltage offset signals Voffset (p)) are stored in the compensation data 169 for calibration or compensation of the pixel array of the detector array 163 and used to compensate all subsequent profile data signals from each pixel p (e.g., by subtraction) on an ongoing basis. Thus, it will be understood that the background signal component Vback(p) is assumed to be compensated in a known manner in various embodiments according to this invention, and it is not necessary that it be further explicitly considered or described in relation to the various intensity profiles or inventive signal processing operations, or the like, described below.

In contrast to the background signal component Vback(p), which may be relatively stable over time, the coordinate-independent bias signal level Vbias may change as a result of voltage drifts associated with ambient temperature changes and heat generated by the electronics portion 160 during operation.

Figure 3:
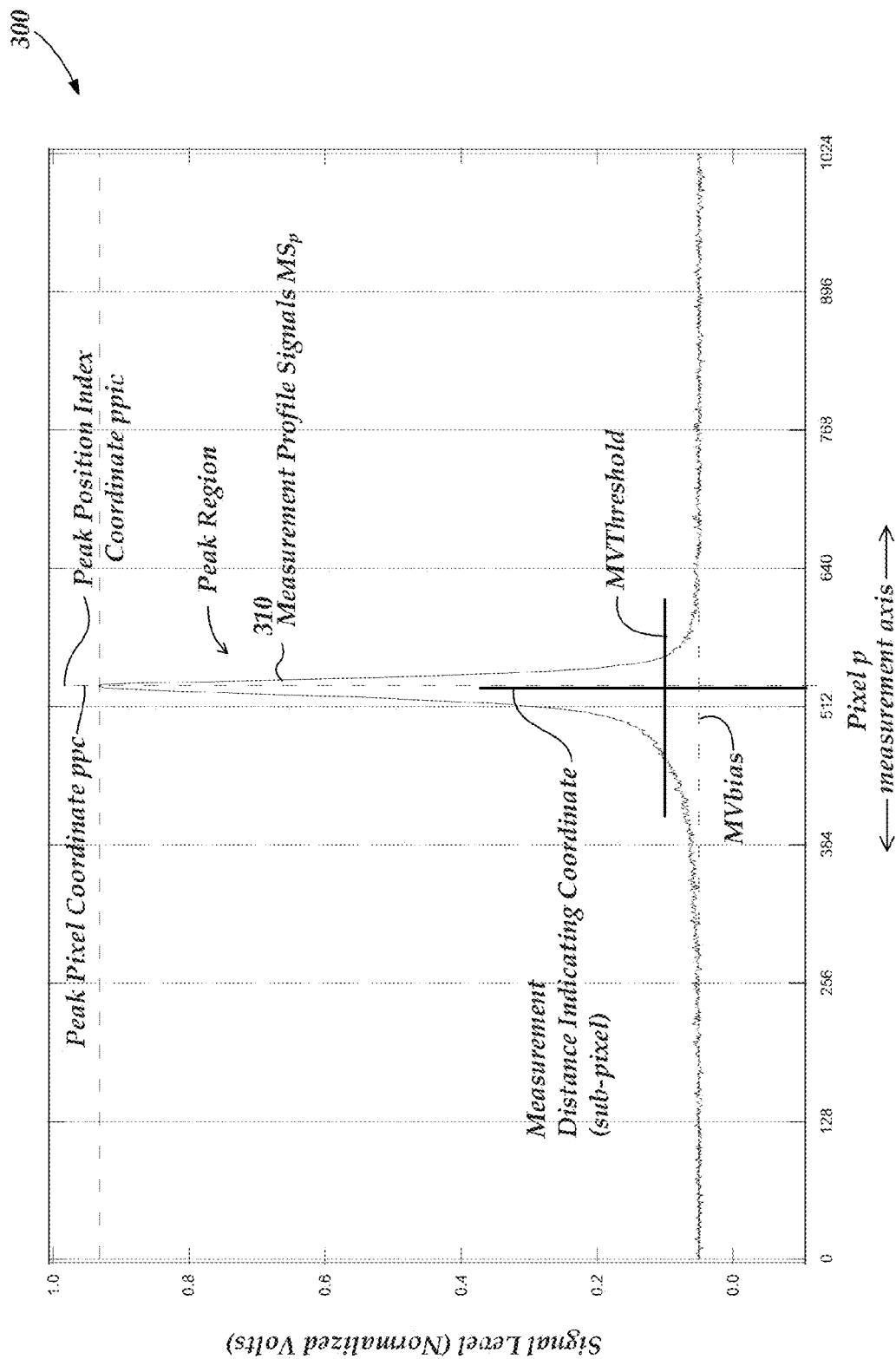
FIG. 3 is a diagram of profile data from a chromatic point sensor illustrating a normal peak region signal corresponding to a reliable measurement distance-indicating coordinate.
Figure 4:
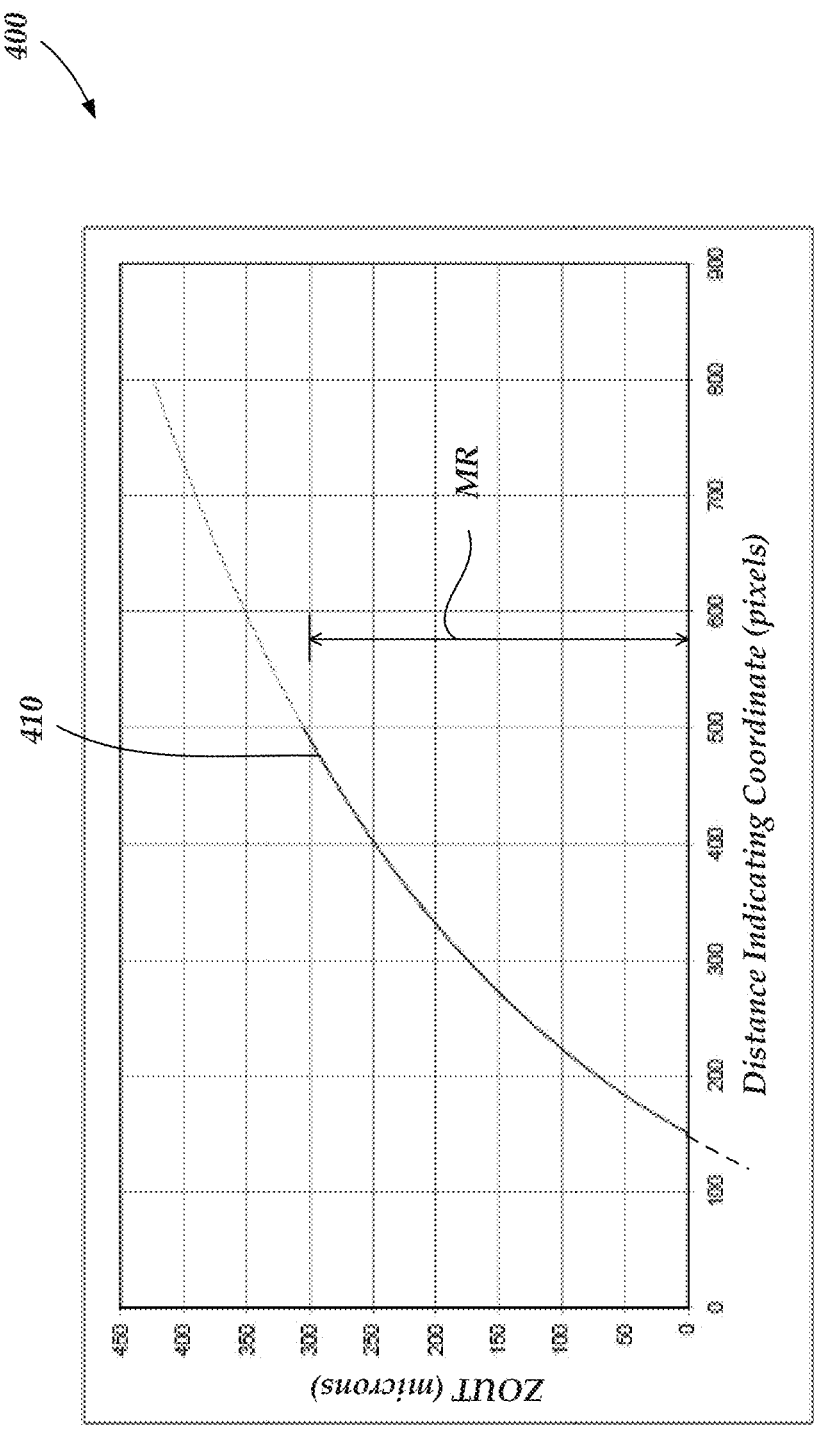
FIG. 4 is a diagram of chromatic range sensor distance calibration data which correlates known measurement distances with distance-indicating coordinates for a chromatic point sensor.

The following description of FIGS. 3 and 4 outlines certain signal processing operations that determine distance-indicating coordinates based on a distance-indicating subset of the profile data that is dynamically adapted to compensate for changes in the contemporaneous bias signal level Vbias, resulting in more repeatable distance measurements. The operations outlined here are described in more detail in the '456 patent, and in U.S. Pat. No. 7,990,522 (the '522 patent), which is hereby incorporated herein by reference in its entirety. The purpose of this description is to provide background information which is useful for an overall understanding of chromatic range sensor distance measurement operations, and to emphasize that the inventive methods disclosed further below are distinct from, but compatible with, these operations.

FIG. 3 is a diagram 300 of profile data 310 (measurement profile signal data) from a CRS detector (e.g., detector 162), as acquired during CRS measurement operations, either during certain optical element or overall system calibration operations or during regular measurement operation. The profile data 310 illustrates a normal peak region signal which is relatively symmetric and corresponds to a reliable measurement distance-indicating coordinate. The profile data 310 may also be referred to as the profile signals MS(p), where MS(p) is the signal level (shown in normalized volts) associated with each pixel p of a detector array (e.g., the detector array 163). The graph 300 of FIG. 3 is created with the target surface 190 positioned at some distance along the optical axis OA of the optical element 120, producing the corresponding measurement profile data 310 having the dominant wavelength peak region shown in FIG. 3.

FIG. 3 shows a bias signal level MVbias (in normalized volts), a peak pixel coordinate ppc, a peak position index coordinate ppic, and a data threshold MVthreshold that defines the lower limit of a distance-indicating subset of the data in the peak region. All "MV" values are in normalized volts. FIG. 3 also shows a distance-indicating coordinate (DIC) that is determined based on the distance-indicating subset of the data in the calibration spectral peak region. As described in the '522 Patent, MVthreshold may be an index-specific threshold, MVthreshold(ppic), in some embodiments.

Briefly, in one embodiment, measurement operations for determining a distance-indicating coordinate (e.g., a distance-indicating coordinate DIC, as described relative to the profile data 310), may include the following:

Position the target surface along the optical axis OA, and capture the resulting profile data 310.

Determine the peak pixel coordinate (that is, the pixel having the highest signal).

Determine the peak position index coordinate ppic, which is the index for storing and retrieving certain calibration data (e.g., index-specific threshold calibration data). This may be the same as the peak pixel coordinate in some embodiments.

Determine the measurement bias signal level MVbias.

Determine the data threshold MVthreshold (e.g., as a percentage of the peak height, or based on index-specific threshold calibration data that corresponds to the current peak position index coordinate ppic).

Determine the distance-indicating coordinate DIC with subpixel resolution, based on the distance-indicating subset of the data that has a value greater than MVthreshold in the measurement peak region.

For a distance calibration measurement, independently determine the corresponding distance to the target surface with a desired accuracy (e.g., by interferometer), and determine a distance calibration data point in a distance calibration table or curve (e.g., a distance calibration table or curve such as that represented by the distance calibration data 410, shown in FIG. 4).

For a normal workpiece distance measurement, determine the measurement distance by correlating the measurement DIC with a corresponding distance in the stored distance calibration data (e.g., a distance calibration table or curve such as that represented by the distance calibration data 410, shown in FIG. 4).

In the foregoing operations, the distance-indicating coordinate DIC may be determined with subpixel resolution, based on the distance-indicating subset of data above MVthreshold. A measurement DIC may be determined according to one of a number of different methods. In one embodiment, a measurement DIC may be determined as the subpixel-resolution coordinate of a centroid $X_C$ of the distance-indicating subset of data. For example, for a detector with 1024 pixels, the centroid $X_C$ may be determined according to:

$$X_C = \frac{\sum_{p=1}^{1024} p(S_M(p))^n}{\sum_{p=1}^{1024} (S_M(p))^n} \quad \text{(Eq. 1)}$$

where, $$S_M(p) = \begin{cases} MS_p - MVThreshold(ppic), \\ \text{for } MS_p \geq MVThreshold(ppic) \\ 0, \text{ for } MS_p < MVThreshold(ppic) \end{cases} \quad \text{(Eq. 2)}$$

In one specific example, n=2, in EQUATION 1. It will be appreciated that EQUATION 2 restricts the data used in the centroid calculation to a distance-indicating subset of data. When the distance-indicating coordinate DIC is determined during calibration operations, it may be referred to as a calibration distance-indicating coordinate, as well as a measurement distance indicating coordinate.

FIG. 4 is a diagram 400 of CRS measurement distance calibration data 410 which correlates known or calibrated measurement distances ZOUT (in microns) along the vertical axis with distance-indicating coordinates (in units of pixels) along the horizontal axis, for the chromatic range sensor 100, or the like. The example shown in FIG. 4 is for an optical element having a specified measurement range MR of 300 microns, which corresponds to calibration distance-indicating coordinates in the range of approximately 150-490 pixels. However, the chromatic range sensor 100 may be calibrated over a larger pixel range of the detector array 163, if desired. The reference or "zero" ZOUT distance is somewhat arbitrary, and may be set at a desired reference distance relative to the optical element 120. Although the distance calibration data 410 appears to form a smooth curve, it should be appreciated that the distance calibration 410 for a typical prior art CRS system, particularly for economical CRS systems, may exhibit short-range errors or irregularities.

In some embodiments, the CRS measurement distance calibration data 410 may be determined and/or used as outlined above with reference to FIG. 3. One exemplary laboratory calibration method is briefly outlined here, to further clarify the nature of the CRS distance calibration data 410. Briefly, a mirror may provide a calibration surface (e.g., substituting for the surface 190 of FIG. 1) along the optical axis OA of the CRS optical element. The displacement of the minor may be controlled in approximately 0.1 or 0.2 micron steps. For each step, the actual mirror position or displacement is acquired using a reference standard, such as an interferometer. For each actual minor position, the corresponding calibration distance-indicating coordinate (DIC) of the chromatic range sensor is determined, based on the corresponding intensity profile data provided by the CRS detector (e.g., as outlined previously). The calibration distance-indicating coordinate and the corresponding actual position are then recorded to provide the calibration data 410.

Later, during measurement operations, to provide a distance measurement for a workpiece surface (e.g., surface 190 of FIG. 1), the workpiece surface is positioned along the optical axis OA of the CRS optical element. The measurement distance-indicating coordinate of the chromatic range sensor is determined, based on the measurement distance-indicating coordinate determined from the intensity profile data provided by the CRS detector. Then, the distance calibration data 410 is used to determine the CRS measurement distance ZOUT that corresponds to that specific measurement distance-indicating coordinate.

It should be appreciated that the calibration data 410 is collected using a well-behaved surface (e.g., a mirror) which does not result in unexpected secondary reflections. Therefore, the profile data 310 shown in FIG. 3, when measured during calibration operations, has a relatively symmetric peak region. As discussed further below, this results in a distance-indicating coordinate DIC (e.g., as determined by the peak region centroid) which is very close to the peak pixel index coordinate ppic. When profile data corresponds to an output spectral profile with a secondary reflection due to conditions such as light reflected by the front and back surfaces of a thin film, or unexpected secondary reflection light that passes back through a measurement location that is intended to provide the primary reflection light as the basis for a measurement, the peak region will become asymmetric and will not correspond to the conditions of calibration which measured a well-behaved surface. For example, the distance-indicating coordinate DIC (e.g., as determined by the peak region centroid) may be far from the peak pixel index coordinate ppic (e.g., as determined from the highest peak of a multi-peak spectrum). Thus, it will be appreciated that methods for identifying a distance-indicating coordinate and a corresponding CRS measurement distance that operate properly for "normal" relatively symmetric peak regions may result in unexpected and/or unpredictable measurement results when a peak region is abnormally asymmetric. Various considerations with respect to abnormal spectral profiles and asymmetric peak regions are outlined below.

Figure 5:
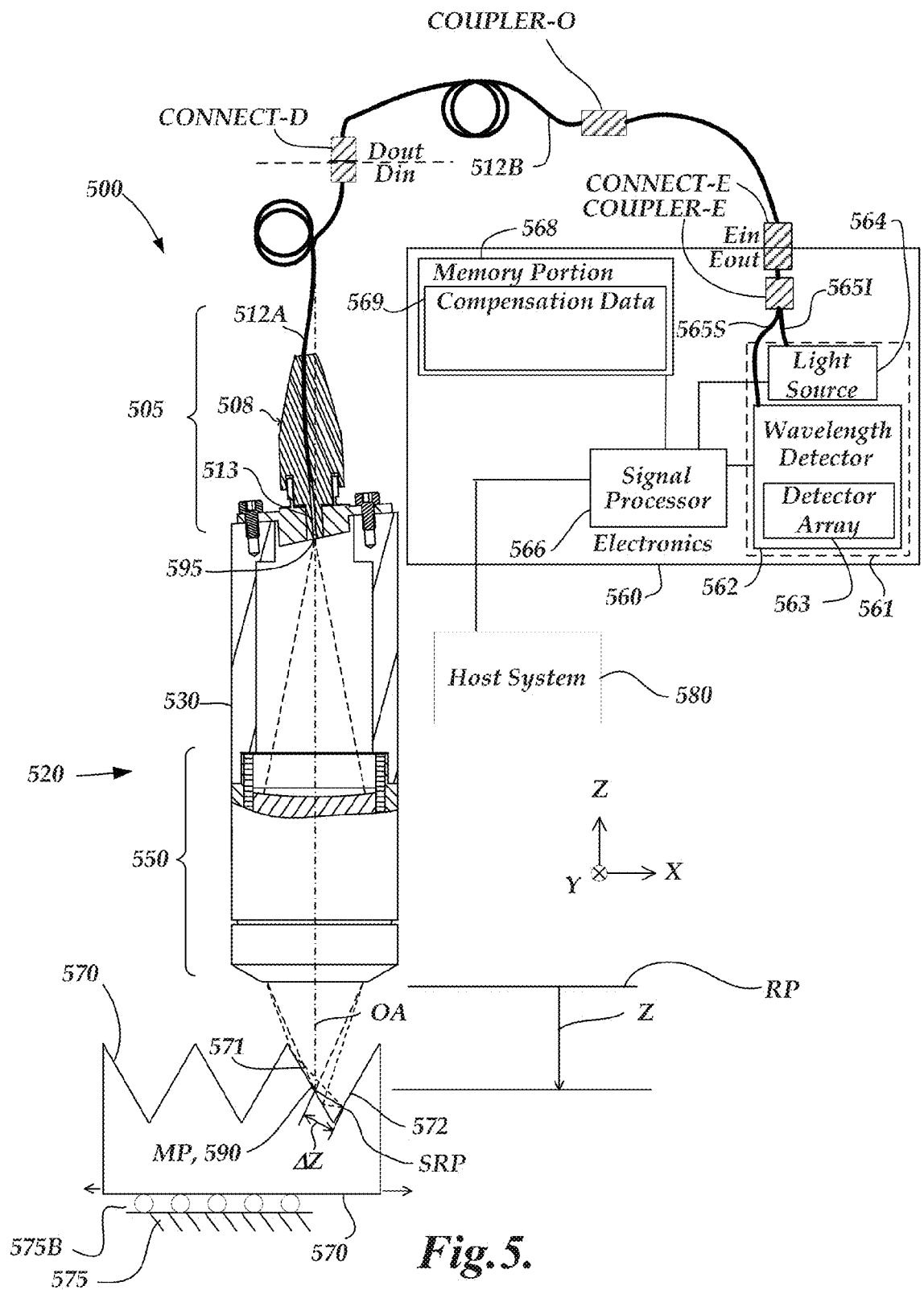
FIG. 5 is a diagram of a one embodiment of an exemplary CRS system applied to measure a surface that may produce abnormal spectral profiles at some measurement locations.

FIG. 5 is a diagram of one embodiment of an exemplary chromatic range sensor (CRS) system 500 applied to measure a schematically illustrated surface that may produce abnormal spectral profiles (e.g., asymmetrical peak regions) at some measurement locations. The CRS system 500 comprises elements which are similar to the CRS system 100 of FIG. 1. It should be appreciated that similarly numbered elements 5XX are similar or identical to elements 1XX of FIG. 1, and only those elements which are significantly different are outlined with respect to FIG. 5. As shown in FIG. 5, in some embodiments, the CRS electronics 560 may be connected to a host system 580 which may receive and/or exchange control signals and data with the CRS electronics 500. It will be appreciated that in various embodiments, the operations of the systems and methods disclosed and claimed herein, such as analyzing output spectral profile data to provide a peak region asymmetry characterization that indicates whether the peak region is abnormally asymmetric, may be performed in either the CRS electronics 560 or the host system 580. In one embodiment, the host system may include automatic motion control (e.g., as in a machine vision inspection system) and may define and execute part programs that operate the CRS system in the role of a non-contact measurement probe to perform inspection operations.

As shown in FIG. 5, the CRS system 500 is used to measure the surface of a workpiece 570 at an intended measurement point MP having a surface location 590. In one embodiment, the workpiece 570 is aligned and mounted on a translation stage 575 which may be advantageously aligned such that it translates along the X axis direction constrained by guide bearings 575B in order to acquire surface profile measurements such as those illustrated in FIG. 7, described further below. The workpiece 570 comprises a surface face 571 and a surface face 572 (which may be relatively reflective metal thread surfaces, for example). The CRS system 500 is positioned to measure a Z height at the intended measurement point MP on the face 571. As indicated by the dashed lines which represent focused wavelengths which contribute to the output spectral profile, the intended measurement point MP provides a primary reflection of a portion of the measurement beam comprising a first wavelength, which contributes a first wavelength peak to the output spectral profile. However, a significant portion of the measurement beam is reflected from the face 571 and continues on to the face 572. That portion of the measurement beam includes a second wavelength that is focused on and reflected from a secondary reflection point SRP on the face 572 back to the face 571 which reflects that second wavelength back along the optical axis to contribute a second wavelength peak to the output spectral profile in the CRS system 500.

Figure 6:
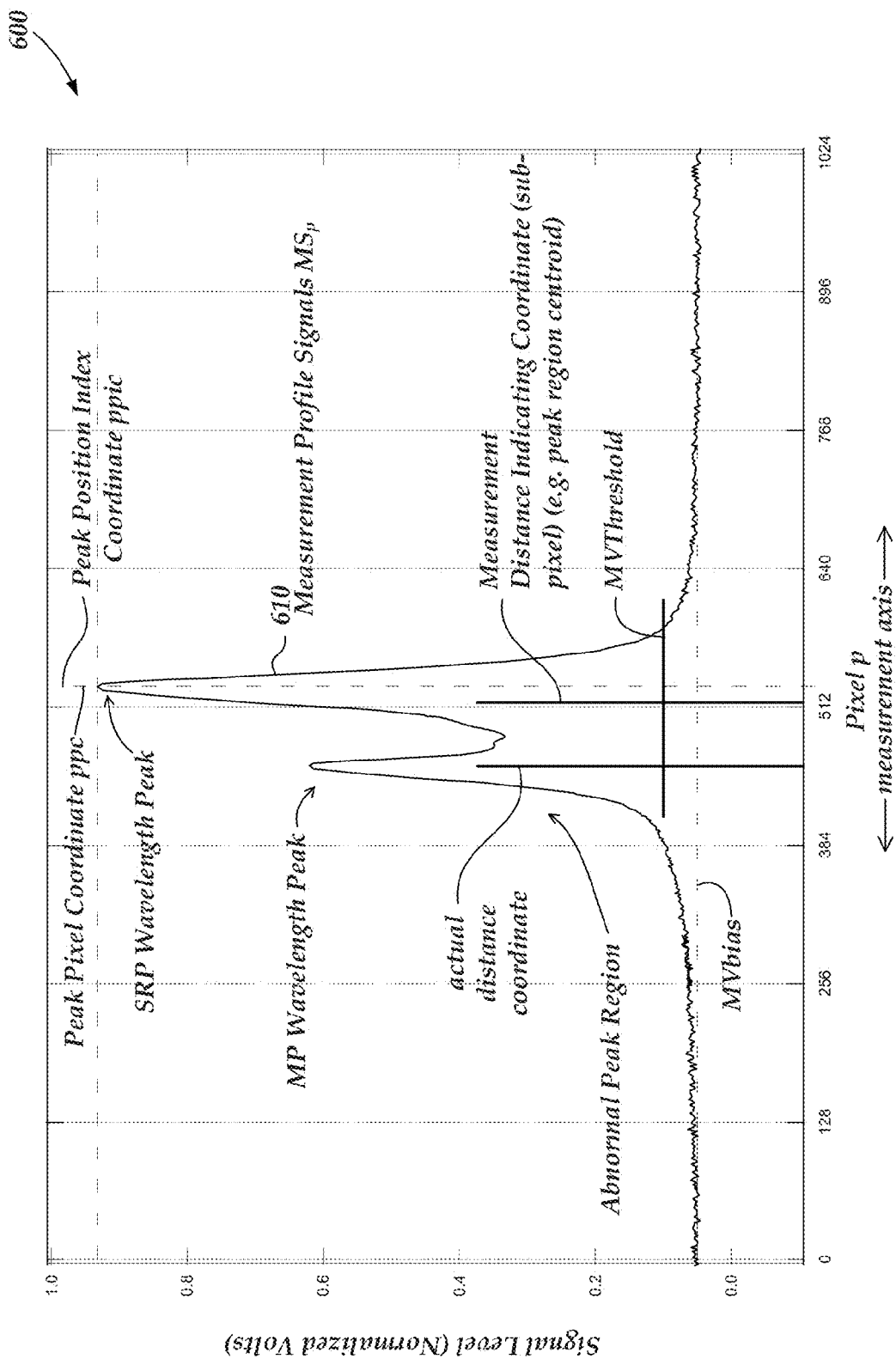
FIG. 6 is a diagram of abnormal spectral profile data from a chromatic range sensor illustrating an asymmetric peak region signal and an erroneous measurement distance-indicating coordinate resulting from combined primary and secondary reflections.

As shown in FIG. 5, the secondary reflection point SRP has a measurement path length difference $\Delta Z$ relative to the intended measurement point MP. When the measurement path length difference $\Delta Z$ is large enough, it results in a clearly defined secondary peak in profile data associated with this measurement point as illustrated in FIG. 6. When the measurement path length difference $\Delta Z$ is smaller, the secondary peak may be so close to the primary peak that they simply combine to form an abnormally distorted and/or asymmetric peak region. In the example shown in FIG. 5, the schematically illustrated surface 570 has a surface profile similar to a screw thread, but it should be appreciated that similar secondary reflection effects may occur during measurement operations for other types of workpiece features such as narrow holes or trenches, or the like.

FIG. 6 is a diagram 600 of abnormal profile data 610 from the CRS system 500, illustrating an asymmetric peak region signal and an erroneous measurement distance-indicating coordinate resulting from combined primary and secondary reflections. The profile data of FIG. 6 may correspond to the measurement situation illustrated in FIG. 5, for example. As shown in FIG. 6, the abnormal peak region of the profile data 610 includes an MP wavelength peak and an SRP wavelength peak. The MP wavelength peak in the output spectral profile data corresponds to radiation focused on and reflected at the intended measurement point MP on the face 571, whereas the SRP wavelength peak corresponds to radiation focused on and reflected at secondary reflection point SRP on the face 572.

It may be noted that the SRP wavelength peak exhibits a stronger signal level than that of the MP wavelength peak. This is because little radiation is reflected from the intended measurement point MP to the CRS system due to its angle of incidence on the face 571 and a surface finish that is highly polished resulting in a more specular reflection, whereas much radiation is reflected at approximately normal incidence at the secondary reflection point SRP, and then mostly returned to the CRS system by subsequent reflection at the face 571. An abnormal peak region may or may not include this particular anomalous effect. In any case, a normal peak region is relatively symmetric and identifying the representative wavelength peak for such a peak region using a fast processing method such as a centroid method or a relatively simple curve fitting method, or the like, may provide repeatable and reliable measurement results for a CPS system. However, such fast processing methods do not provide repeatable and reliable measurement results for unpredictably asymmetric peak regions, which violate the assumptions of the methods and the assumptions used for calibration. For example, as shown in FIG. 6, the actual distance coordinate the measurement point MP should be in the vicinity of the MP wavelength peak near pixel 456. However, when using a centroid method (e.g., EQUATION 1) for determining the measurement distance-indicating coordinate of the abnormal peak region, the measurement distance-indicating coordinate is located near pixel 516, which is a very large error, and is closer to the peak pixel coordinate of approximately 532 associated with the SRP wavelength peak.

An abnormal peak region may or may not include the particular anomalous effect wherein the secondary reflection peak is larger than the primary reflection peak. Furthermore, the peaks need not be so widely separated as to be separately distinguishable in the output spectral profile (e.g., they may appear to form a single distorted peak). In any case, from the foregoing description, it will be understood that when an unexpected secondary reflection contributes significantly to the output spectral profile, it will cause the peak region to become significantly asymmetric. Thus, identifying an abnormally asymmetric peak region is sufficient to identify a potentially unreliable measurement in a number of cases, at least in cases where special signal processing is not being used to identify expected dual peaks for transparent thin film measurement, or the like. As disclosed herein, in various embodiments it is advantageous for a CRS system (or a host system attached to the CRS system) to be able to analyze peak region data in order to characterize the peak region asymmetry. When the peak region asymmetry is abnormal, it may be advantageous to indicate this, or at least provide an indication that a related measurement result may be unreliable. In some embodiments, it may be desirable to provide these features automatically for every measurement cycle of the CPS. In some embodiments, it may be desirable to provide these features according to a user selection of a related operating mode or parameter, such that the user may invoke such features for measuring workpieces or measurement points that are likely to produce secondary reflections, and may suppress such features for measuring workpieces or measurement points that are unlikely to produce secondary reflections.

In various embodiments, the CRS system 500 is operated to provide an output spectral profile from a measurement point on a workpiece surface and provide the corresponding output spectral profile data (e.g., the profile data 610). The output spectral profile data is analyzed to provide a peak region asymmetry characterization and a corresponding abnormality indicator is provided if the peak region asymmetry characterization indicates that the peak region is abnormally asymmetric. Various types of asymmetry characterizations are described herein, and other methods of characterizing the asymmetry of a peak region will be apparent to one skilled in the art based on this disclosure. In some embodiments, the degree of asymmetry that is considered "abnormal" may be determined heuristically, by measuring well-behaved representative "normal" workpieces, and determining an expected normal range of asymmetry (according to a chosen method of characterization). In some embodiments, the degree of asymmetry that is considered "abnormal" may be determined by analysis, for example, by determining an amount of asymmetry (according to a chosen method of characterization) that results in displacement of the centroid by an amount that creates a distance measurement error that exceeds a desired error limit.

In some embodiments, the step of analyzing the output spectral profile data to provide a peak region asymmetry characterization comprises determining the value of a peak region asymmetry metric based on the output spectral profile data. In some embodiments, the step of providing a corresponding abnormality indicator if the peak region asymmetry characterization indicates that the peak region is abnormally asymmetric may comprise comparing the value of the peak region asymmetry metric to an asymmetry metric threshold value (e.g., determined heuristically or by analysis), and providing the corresponding abnormality indicator if the value of the peak region asymmetry metric exceeds the asymmetry metric threshold value. In some embodiments, determining the value of a peak region asymmetry metric may comprise determining a peak pixel coordinate (e.g., the peak pixel coordinate or the peak position index coordinate) based on the output spectral profile data, determining a measurement distance-indicating coordinate based on the output spectral profile data (e.g., a centroid of the peak region), and determining the value of the peak region asymmetry metric based on a difference between the peak pixel coordinate and the measurement distance-indicating coordinate. For example, it will be appreciated that for a perfectly symmetric peak region these coordinates will be nominally the same, and for an significantly asymmetric peak region (such as that shown in FIG. 6), there is a significant difference between the peak pixel coordinate and the measurement distance-indicating coordinate. In some embodiments, the difference between the peak pixel coordinate and the measurement distance-indicating coordinate is a number of pixels, and the asymmetry metric threshold value comprises a threshold number of pixels which may be at least 5 pixels in some embodiments. For the example shown in FIG. 6, the difference is approximately 16 pixels. This type of asymmetry characterization has advantages such as fast execution and reuse of data that may already be required for normal measurement operations. However, it is exemplary only, and not limiting. It should be appreciated that in general, various peak region asymmetry metrics may be determined to identify abnormal peak region asymmetry. For example, in some embodiments, a skewness measure may be applied to determine a peak region asymmetry metric according to methods such as a third standardized moment, a Pearson coefficient or other known skewness metrics. In some embodiments, the threshold number of pixels or skewness may be selected by a user in a user interface connected to the CRS system, e.g., a user interface in the host system 580. In some embodiments, the corresponding abnormality indicator from the CRS system 500 may be output (e.g., to the host system 580) if the peak region asymmetry characterization indicates that the peak region is abnormally asymmetric. In some embodiments, the abnormality indicator is output in association with a corresponding measurement distance output by the CRS system (e.g., in a measurement data set that is output by the CRS system each measurement cycle).

Figure 7:
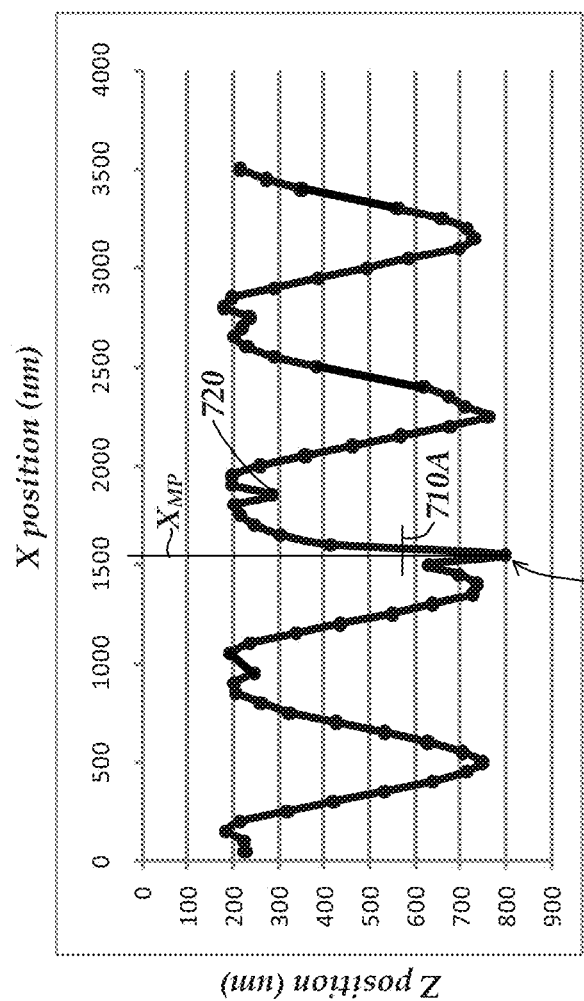
FIG. 7 is a diagram of surface profile corresponding to a workpiece similar to that shown in FIG. 5 and comprising multiple measurement points.

FIG. 7 is a diagram 700 of a surface profile of some rolled threads (e.g., screw threads), analogous to the schematic surface profile shown in FIG. 5, which comprises multiple measurement points. The surface profile is illustrated as a plot of the Z height versus X position. A measurement point 710 is analogous to the measurement point MP shown in FIG. 5 in that it produces an erroneous measurement value influenced by a secondary reflection and an associated asymmetric peak region such as that shown in FIG. 6. Previously known methods of analyzing thread profile data based on CRS measurement data might eliminate the measurement point 710 based on geometric outlier analysis, but based on the systems and methods disclosed herein, it could be eliminated more quickly, robustly, and reliably based on a peak region abnormality indicator provided by the CRS system along with the associated distance measurement value. The value of this approach is further demonstrated by consideration of the measurement point 720. The measurement point 720 looks to be in error and would be eliminated based on geometric outlier analysis. However, in fact, the measurement point 720 is an actual feature of some rolled threads, and it would be robustly and reliably retained based on the absence of a peak region abnormality indicator being provided in association with its distance measurement value.

Figure 8:
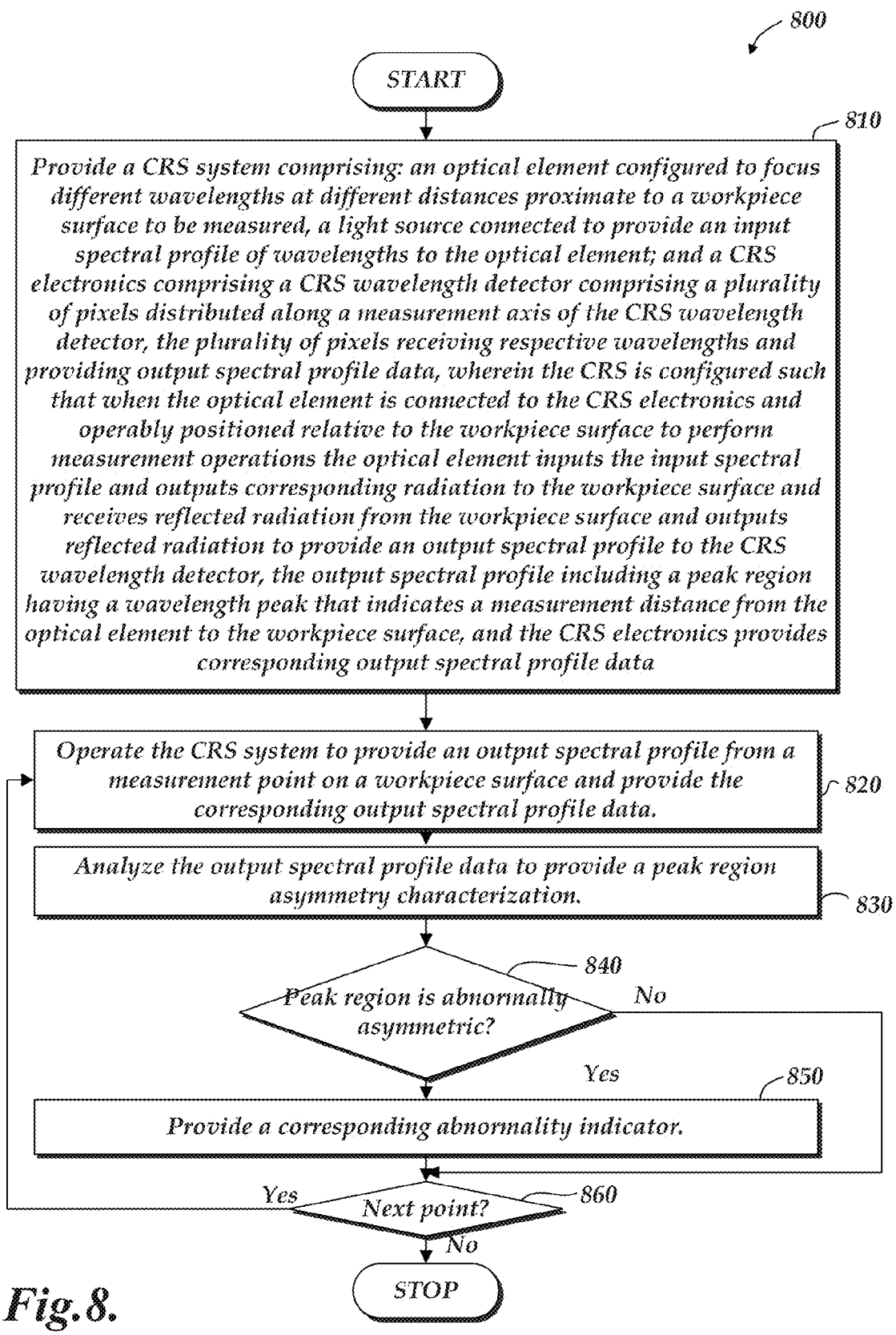
FIG. 8 is a flow diagram illustrating a routine for operating a chromatic range sensor (CRS) system to identify abnormal spectral profiles arising from light reflected from more than one portion of a workpiece surface.

FIG. 8 is a flow diagram illustrating a routine 800 for operating a chromatic range sensor (CRS) system to identify abnormal spectral profiles arising from light reflected from more than one portion of a workpiece surface, such as the spectral profile corresponding to the abnormal profile data 610.

At block 810, a CRS system is provided comprising: an optical element configured to focus different wavelengths at different distances proximate to a workpiece surface to be measured, a light source connected to provide an input spectral profile of wavelengths to the optical element; and CRS electronics comprising a CRS wavelength detector comprising a plurality of pixels distributed along a measurement axis of the CRS wavelength detector, the plurality of pixels receiving respective wavelengths and providing output spectral profile data, wherein the CRS is configured such that when the optical element is connected to the CRS electronics and operably positioned relative to the workpiece surface to perform measurement operations, the optical element inputs the input spectral profile and outputs corresponding radiation to the workpiece surface and receives reflected radiation from the workpiece surface and outputs reflected radiation to provide an output spectral profile to the CRS wavelength detector, the output spectral profile including a peak region having a wavelength peak that indicates a measurement distance from the optical element to the workpiece surface, and the CRS electronics provide corresponding output spectral profile data.

At block 820, the CRS system is operated to provide an output spectral profile from a measurement point on a workpiece surface and provide the corresponding output spectral profile data.

At block 830, the output spectral profile data is analyzed to provide a peak region asymmetry characterization. For example, this may be provided as described with respect to FIG. 3. In some embodiments, the block 830 may be performed by the CRS system. In some embodiments, the block 830 may be performed automatically by the CRS system.

At decision block 840, a decision is made whether the peak region asymmetry characterization indicates that the peak region is abnormally asymmetric. If the asymmetry metric peak region asymmetry characterization does not indicate that the peak region is abnormally asymmetric, the routine continues to decision block 860. If the peak region asymmetry characterization indicates that the peak region is abnormally asymmetric, the routine continues to block 850 where a corresponding abnormality indicator is provided.

At decision block 860, a determination is made whether a next point is to be measured. In some embodiments, the blocks 820 through 850 are performed repeatedly for a series of measurement points (e.g., for measuring a surface profile such as the surface profile in FIG. 7). In some embodiments, the blocks 820 through 850 may be performed repeatedly at a measurement rate of the CRS system.

If a next point is to be measured, the routine returns to block 820. If a next point is not to be measured, then the routine ends.

In some embodiments, the routine may further comprise outputting a signal indicating that a measurement corresponds to an abnormal spectral profile.

In some embodiments, the routine may further comprise displaying an indicator in a user interface that indicates that a measurement corresponds to an abnormal profile. For example, a graph showing a series of measurement points may include a marker with a unique color or shape indicating that a measurement point corresponds to an abnormal spectral profile.

The foregoing operations may be performed under the control of the CRS electronics in some embodiments or a host system in other embodiments (e.g., a signal processing system may characterize output spectral profile data by executing a desired analysis routine stored in memory, to provide an asymmetry characterization, and the result may compared to a normally expected result or results stored in memory).

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The invention claimed is:

1. A method for operating a chromatic range sensor (CRS) system to identify abnormal spectral profiles arising from light reflected from more than one portion of a workpiece surface, the method comprising:
   providing a CRS system comprising:
      an optical element configured to focus different wavelengths at different distances proximate to a workpiece surface to be measured, a light source connected to provide an input spectral profile of wavelengths to the optical element; and CRS electronics comprising a CRS wavelength detector comprising a plurality of pixels distributed along a measurement axis of the CRS wavelength detector, the plurality of pixels receiving respective wavelengths and providing output spectral profile data, wherein the CRS is configured such that when the optical element is connected to the CRS electronics and operably positioned relative to the workpiece surface to perform measurement operations, the optical element inputs the input spectral profile and outputs corresponding radiation to the workpiece surface and receives reflected radiation from the workpiece surface and outputs reflected radiation to provide an output spectral profile to the CRS wavelength detector, the output spectral profile including a peak region having a wavelength peak that indicates a measurement distance from the optical element to the workpiece surface, and the CRS electronics providing corresponding output spectral profile data;

operating the CRS system to provide an output spectral profile from a measurement point on a workpiece surface and provide the corresponding output spectral profile data;

analyzing the output spectral profile data to provide a spectral peak region asymmetry characterization; and providing a corresponding abnormality indicator if the spectral peak region asymmetry characterization indicates that the peak region is abnormally asymmetric.

2. The method of claim 1, wherein the step of analyzing the output spectral profile data to provide a peak region asymmetry characterization is performed by the CRS system.

3. The method of claim 2, wherein the step of analyzing the output spectral profile data to provide a peak region asymmetry characterization is performed automatically by the CRS system.

4. The method of claim 3, wherein the operating, analyzing, and providing steps are performed repeatedly.

5. The method of claim 2, wherein the operating, analyzing, and providing steps are performed repeatedly at a measurement rate of the CRS system.

6. The method of claim 1, wherein the step of analyzing the output spectral profile data to provide a peak region asymmetry characterization comprises determining the value of a peak region asymmetry metric based on the output spectral profile data.

7. The method of claim 6, wherein the step of providing a corresponding abnormality indicator if the peak region asymmetry characterization indicates that the peak region is abnormally asymmetric comprises comparing the value of the peak region asymmetry metric to an asymmetry metric threshold value, and providing the corresponding abnormality indicator if the value of the peak region asymmetry metric exceeds the asymmetry metric threshold value.

8. The method of claim 7, wherein determining the value of a peak region asymmetry metric comprises determining a peak pixel coordinate based on the output spectral profile data, determining a measurement distance-indicating coordinate based on the output spectral profile data, and determining the value of the peak region asymmetry metric based on a difference between the peak pixel coordinate and the measurement distance-indicating coordinate.

9. The method of claim 8 wherein the difference between the peak pixel coordinate and the measurement distance-indicating coordinate is a number of pixels and the asymmetry metric threshold value comprises a threshold number of pixels.

10. The method of claim 9 wherein the threshold number of pixels is at least 5.

11. The method of claim 9, wherein the threshold number of pixels is selected by a user in a user interface connected to the CRS system.

12. The method of claim 7, wherein determining the value of a peak region asymmetry metric comprises determining a Pearson coefficient.

13. The method of claim 1, further comprising outputting the corresponding abnormality indicator from the CRS system if the peak region asymmetry characterization indicates that the peak region is abnormally asymmetric.

14. The method of claim 13, wherein the abnormality indicator is output in association with a corresponding measurement distance output by the CRS system.

15. The method of claim 1, wherein the CRS system comprises a chromatic point sensor system, and wherein the optical element comprises an optical pen.

\* \* \* \* \*